United States Patent
Tiell

(10) Patent No.: US 10,600,067 B2
(45) Date of Patent: Mar. 24, 2020

(54) DEMOGRAPHIC BASED ADJUSTMENT OF DATA PROCESSING DECISION RESULTS

(71) Applicant: Accenture Global Solutions Limited, Dublin (IE)

(72) Inventor: Steven C. Tiell, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 401 days.

(21) Appl. No.: 15/184,668

(22) Filed: Jun. 16, 2016

(65) Prior Publication Data
US 2017/0364934 A1     Dec. 21, 2017

(51) Int. Cl.
*G06Q 30/02*     (2012.01)

(52) U.S. Cl.
CPC ..... *G06Q 30/0205* (2013.01); *G06Q 30/0201* (2013.01)

(58) Field of Classification Search
CPC ................. G06Q 30/0205; G06Q 30/0201
See application file for complete search history.

(56) References Cited

U.S. PATENT DOCUMENTS

| | | | | |
|---|---|---|---|---|
| 8,073,801 B1* | 12/2011 | von Halle | ............ | G06Q 10/067 705/1.1 |
| 2003/0046138 A1* | 3/2003 | Cary | ............ | G06Q 30/02 705/7.29 |
| 2008/0086342 A1* | 4/2008 | Curry | ............ | G06Q 40/025 705/38 |
| 2010/0205220 A1* | 8/2010 | Hart | ............ | G06F 17/30958 707/797 |
| 2011/0258206 A1* | 10/2011 | El Emam | ............ | G06F 21/577 707/754 |
| 2011/0276355 A1* | 11/2011 | Bruce | ............ | G06Q 10/063 705/7.12 |
| 2012/0290104 A1* | 11/2012 | Holt | ............ | G06Q 10/00 700/29 |
| 2013/0085780 A1* | 4/2013 | Braunstein | ............ | G06Q 50/24 705/3 |

(Continued)

OTHER PUBLICATIONS

Zona, "Consequences of an Insightful Algorthm," Data & Analytics, Internet, Software, Aug. 2, 2015. Retrieved from the Internet: URL<http://www.slideshare.net/cczona/consequences-of-an-insightful-algorithm>, 114 pages.

*Primary Examiner* — Sujay Koneru
(74) *Attorney, Agent, or Firm* — Fish & Richardson P.C.

(57) ABSTRACT

Techniques are described for iteratively adjusting data processing decision results in accordance with rules. In some implementations, the applied rules may be data ethics rules associated with particular demographic groups, such as users in a particular geographic location, users in a particular age range, and so forth. The rules may describe the manner in which data, such as data that describes or identifies individuals, is collected, stored, analyzed, applied, manipulated, and/or destroyed. The various stages of data handling may be described as a data supply chain, and a set of rules may apply to the handling of data at one or more stages of the data supply chain. The rules may enforce data privacy considerations and/or other types of constraints on data handling.

20 Claims, 4 Drawing Sheets

(56) References Cited

U.S. PATENT DOCUMENTS

| | | | |
|---|---|---|---|
| 2013/0204669 A1* | 8/2013 | Percy | G06Q 30/0205 705/7.34 |
| 2013/0325493 A1* | 12/2013 | Wong | G06F 19/00 705/2 |
| 2015/0025933 A1* | 1/2015 | Andelman | G06Q 10/0635 705/7.28 |
| 2015/0067075 A1* | 3/2015 | Sheppard | H04L 51/32 709/206 |
| 2015/0149193 A1* | 5/2015 | Jester | G06F 19/327 705/2 |
| 2015/0164412 A1* | 6/2015 | Kokko | A61B 5/4821 600/544 |
| 2015/0220698 A1* | 8/2015 | Argyropoulos | G01N 33/78 705/3 |
| 2015/0268281 A1* | 9/2015 | Haghighat-Kashani | G01R 21/00 702/62 |
| 2015/0310456 A1* | 10/2015 | Vandenburgh | G06Q 30/0201 705/7.32 |
| 2015/0370998 A1* | 12/2015 | Mohebbi | G06F 19/3443 705/3 |
| 2016/0080422 A1* | 3/2016 | Belgodere | H04L 63/20 706/47 |
| 2016/0184497 A1* | 6/2016 | Phillips | A61M 1/0088 604/318 |
| 2016/0232327 A1* | 8/2016 | Windridge | G06F 19/3456 |
| 2017/0161452 A1* | 6/2017 | Bain | G06F 19/3431 |
| 2017/0161614 A1* | 6/2017 | Mehta | G06N 5/022 |
| 2017/0238850 A1* | 8/2017 | Gonzales | A63B 71/0622 |
| 2017/0323265 A1* | 11/2017 | Burrows | G06Q 10/0875 |

\* cited by examiner

| Data ethics rules 112 |||
|---|---|---|
| Data operation 202(1) (e.g., collect, analyze, store, send, destroy data, etc.) | Demographic group(s) 204(1) (e.g., location(s), age group(s), etc.) | Adjusted result 118(1) |
| Data operation 202(2) | Demographic group(s) 204(2) | Adjusted result 118(2) |
| Data operation 202(3) | Demographic group(s) 204(3) | Adjusted result 118(3) |
| Data operation 202(4) | Demographic group(s) 204(4) | Adjusted result 118(4) |
| ⋮ |||

*FIG. 2*

DEMOGRAPHIC BASED ADJUSTMENT OF DATA PROCESSING DECISION RESULTS

BACKGROUND

E-commerce systems, online financial services, health care portals, mobile devices, telematics systems, and/or other types of computing systems may collect large amounts of data describing users, user-requested transactions, or other user activities. Such data may be stored and analyzed to provide user-requested functionality, improve system performance, develop organizational metrics, or for other purposes. An organization responsible for a computing system may strive to ensure that its data handling procedures comply with regulations, rules, laws, or any other norms that may be relevant to system users.

SUMMARY

Implementations of the present disclosure are generally directed to data processing. More specifically, implementations are directed to adjusting data processing results (e.g., iteratively) based on an evaluation of risk metric(s) associated with one or more demographic groups.

In general, innovative aspects of the subject matter described in this specification can be embodied in methods that include actions of: receiving a result of a data processing decision determined by an automated data processing decision engine; determining that the result of the data processing decision is associated with multiple demographic groups; determining at least one risk metric that measures a negative effect of the result on at least one demographic group of the multiple demographic groups; and responsive to determining that the at least one risk metric exceeds at least one risk threshold, adjusting the result of the data processing decision for the at least one demographic group.

Implementations can optionally include one or more of the following features: the result of the data processing decision is to perform at least one operation including one or more of collecting, analyzing, storing, communicating, or destroying the data; the multiple demographic groups correspond to different geographic locations of end-users associated with the data; the multiple demographic groups correspond to different age ranges of end-users associated with the data; the negative effect of the result includes the result being contrary to at least one of a law, a rule, a regulation, or a norm applicable to the at least one demographic group; adjusting the result includes adjusting the result to comply with the at least one of the law, the rule, the regulation, or the norm; the at least one risk metric is based on one or more of a magnitude of the negative effect of the result on the at least one demographic group, or a probability of occurrence of the negative effect of the result on the at least one demographic group; and/or determining that the at least one risk metric exceeds the at least one risk threshold comprises one or more of determining that the magnitude exceeds a magnitude threshold, or determining that the probability exceeds a probability threshold.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Implementations provide for the application of data ethics rules to inform data processing decisions regarding data associated with different demographic groups such as individuals in different locations. Accordingly, implementations provide an improvement over traditional data processing decision engines that may make data processing decisions without any consideration of the different data ethics rules that may be relevant in various situations. Moreover, by taking such rules into account when making data processing decisions, implementations provide a technical improvement and technical advantage over traditional systems that fail to account for data ethics rules. For example, traditional systems may be required to back out, undo, and/or reverse operations taken based on a data processing result if that result is later determined to have violated various data ethics rules and caused harm to one or more groups. Such reversal of previously performed operations may expend processing power, storage space, memory capacity, network bandwidth, and/or other computing resources. By accounting for data ethics rules and by adjusting results to mitigate risk of harm to group(s), implementations mitigate or avoid such expenditures that are present in traditional systems.

Implementations provide a structured data platform capable of quantifying risk from ethical decisions made during data transformation, analysis, and/or predictive tasks carried out on the system or elsewhere (e.g., through API-accessible subroutines). In some implementations, the platform may allow third party developers to publish ethics models and/or algorithms. The platform may render decisions based on analysis of demographic groups represented in the data that may or may not be specified by the operators. Users of the platform can inspect the decisions and rate their agreement with each step of the analysis.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 2 depicts a schematic of example data ethics rules that may be applied to adjust decision results for data processing, according to implementations of the present disclosure.

DETAILED DESCRIPTION

Figure 1:
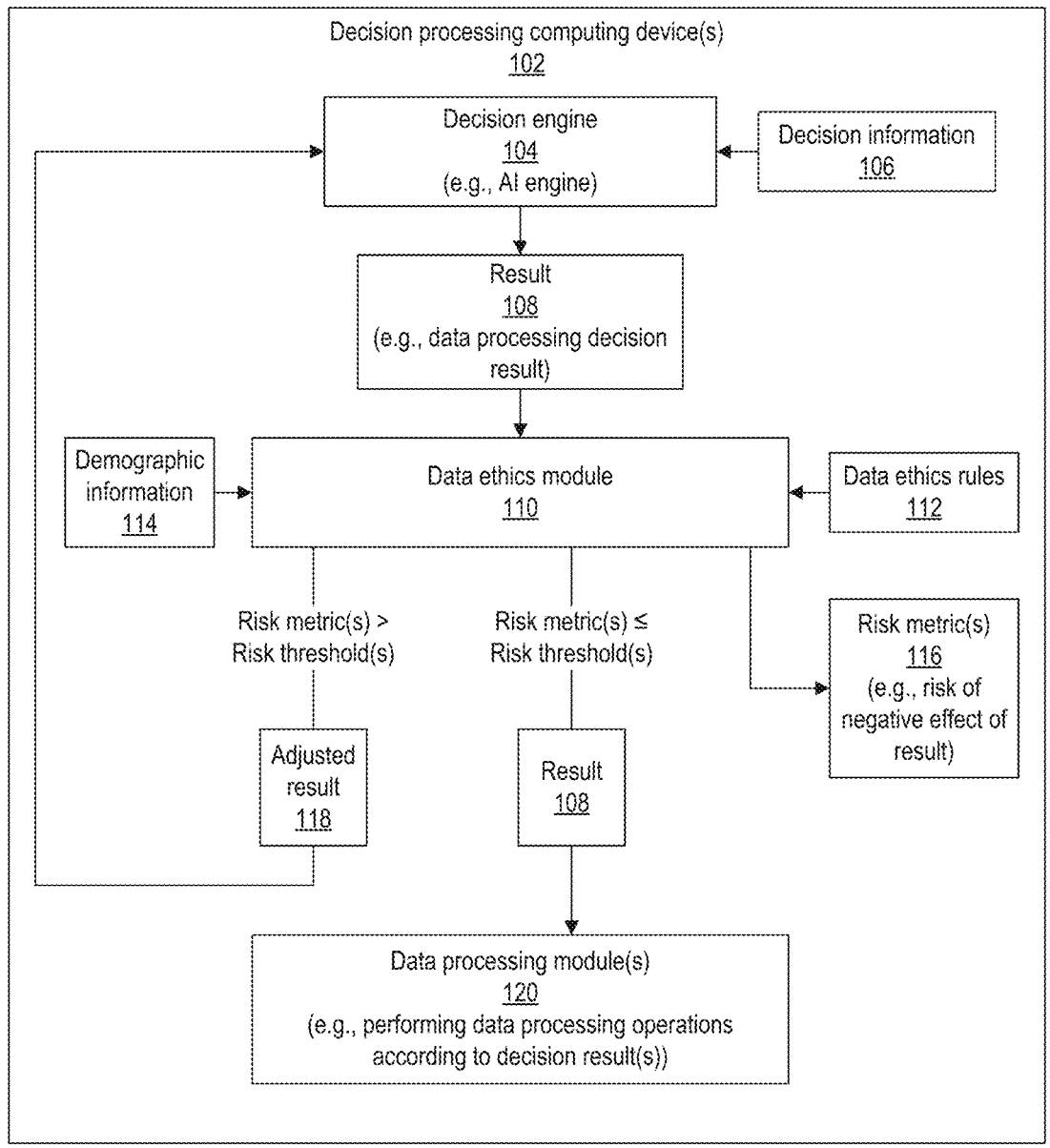
FIG. 1 depicts an example system for demographic based adjustment of decision results for data processing, according to implementations of the present disclosure.

Implementations of the present disclosure are directed to systems, devices, methods, and computer-readable media for adjusting data processing decision results in accordance with data ethics rules associated with particular demographic groups, such as users in a particular geographic location, users in a particular age range, and so forth. Data ethics describes the manner in which data, such as data that describes or identifies individuals, is collected, stored, analyzed, applied, manipulated, and/or destroyed. The various stages of data handling may be described as a data supply chain. In some examples, data ethics include a set of rules that apply to the handling of data at one or more stages of the data supply chain. Data privacy considerations may be included in data ethics, and data ethics may also include other types of constraints on data handling.

As used herein, a demographic group may be a set of individuals who share at least one common characteristic. In some examples, a demographic group may be a set of individuals who live in a particular geographic area or location defined with any degree of specificity. For example, a demographic group may include individuals who live in a particular country, state, province, prefecture, county, city, district, neighborhood, street, block, building, and so forth. Accordingly, a demographic group may be within a hierarchy of nested demographic groups of varying specificity. Other non-limiting examples of demographic groups are: individuals within an age range or of a particular age; individuals who speak a particular language; individuals who are part of a particular religious or faith community; individuals who are part of a particular culture or ethnic heritage; individuals who communicate via a particular social network, game system, or online chat service; and so forth. An individual may be a part of any number of demographic groups, and a demographic group may be characterized by any number of traits. For example, a demographic group may include individuals aged 18-35 living in Oakland, Calif.

Data ethics may differ between demographic groups. For example, different rules may apply to the handling of data in Europe and the United States. As another example, one set of rules may apply to the handling of data collected from members of one religious community and a different set of rules may apply for a different religious community. Traditionally, a decision engine such as an artificial intelligence (AI) engine may make decisions regarding the handling of data, but such a decision engine may be agnostic with regard to data ethics rules. Accordingly, a traditional decision engine may make data handling decisions without regard to the different data ethics that may be relevant to different demographic groups, and may thus cause harm to the various demographic groups by violating their rules, law, traditions, or norms. Implementations provide for the adjustment of data handling decisions based on the data ethics rules that may apply to different demographic groups.

FIG. 1 depicts an example system for demographic based adjustment of decision results for data processing, according to implementations of the present disclosure. The system may include one or more decision processing computing devices 102. The decision processing computing device(s) 102 may include any number of devices of any type, such as server computers, distributed computing devices (e.g., cloud computing servers), and so forth. The decision processing computing device(s) 102 may execute a decision engine 104. The decision engine may be described as an AI engine, and may be configured to analyze decision information 106 and generate a result 108 that is the result of a data processing decision made by the decision engine 104. For example, the decision information 106 may include information describing the possible collection and storage of various types of data regarding individuals, such as data describing the online shopping and browsing activities of users through an e-commerce web site or application. The result 108 may indicate which data, if any, is to be collected, the manner in which the data is to be stored, how long it may be stored, how or to whom the data may be communicated, and/or other operations. Accordingly, the decision engine 104 may be described as making an ethical decision regarding the handling of data. As described above, the decision engine 104 may be agnostic with regard to the different data ethics rules that apply to different demographic groups. Accordingly, the result 108 may apply to multiple demographic groups and may (e.g., inadvertently on the part of the decision engine 104) violate the data ethics rules of certain group(s). In some implementations, the decision engine 104 applies machine learning to generate the result 108 based on the decision information 106. Implementations support the use of any machine learning techniques or algorithms, including supervised and/or unsupervised machine learning.

The result 108 may be accessed by a data ethics module 110 executing on the decision processing computing device(s) 102. The data ethics module 110 may access data ethics rules 112 for one or more demographic groups. The data ethics module 110 may also access demographic information 114 that identifies the demographic groups of the individuals that would be affected by the result 108 of the data processing decision. The data ethics rules 112 are described further with reference to FIG. 2. In some implementations, the data ethics module 110 applies the data ethics rule(s) 112 for the demographic groups identified in the demographic information 114, and determines one or more risk metrics 116 indicating a risk of a negative effect of the result 108 on one or more demographic groups.

If the risk metric(s) 116 do not exceed one or more risk thresholds (e.g., if the risk metric(s) are less than and/or equal to the risk threshold(s)), the data ethics module 110 may forward the unmodified, original result 108 to data processing module(s) 120 that perform data processing operations according to the result 108. If the risk metric(s) 116 exceed the risk threshold(s), the data ethics module 110 may generate an adjusted result 118 by adjusting the result 108 according to the data ethics rules 112 that apply to the affected demographic groups. The data ethics module 110 may provide the adjusted result 118 to the data processing module(s) 120 which perform data processing operation(s) according to the adjusted result 118. Operations of the data ethics module 110 are described further with reference to FIG. 3.

FIG. 2 depicts a schematic of example data ethics rules 112 that may be applied to adjust decision results 108 for data processing, according to implementations of the present disclosure. As shown in the example of FIG. 2, the data ethics rules 112 may include any number of rules. Each rule may describe a data operation 202, one or more demographic groups 204 that may be affected by the data operation 202, and an adjusted result 118 that would mitigate or remove the (e.g., negative) effect of the data operation 202 on the demographic group(s) 204. The data ethics rules 112 may formalize, or otherwise be based on, one or more of the following: laws, regulations, or other types of government-imposed rules that apply to the demographic group(s) 204; norms or traditions practiced within the demographic group(s) 204, such as cultural or religious norms or traditions; rules of etiquette that apply within particular demographic group(s) 204, such as etiquette specific to particular social networks or gaming systems; and so forth.

Figure 3:
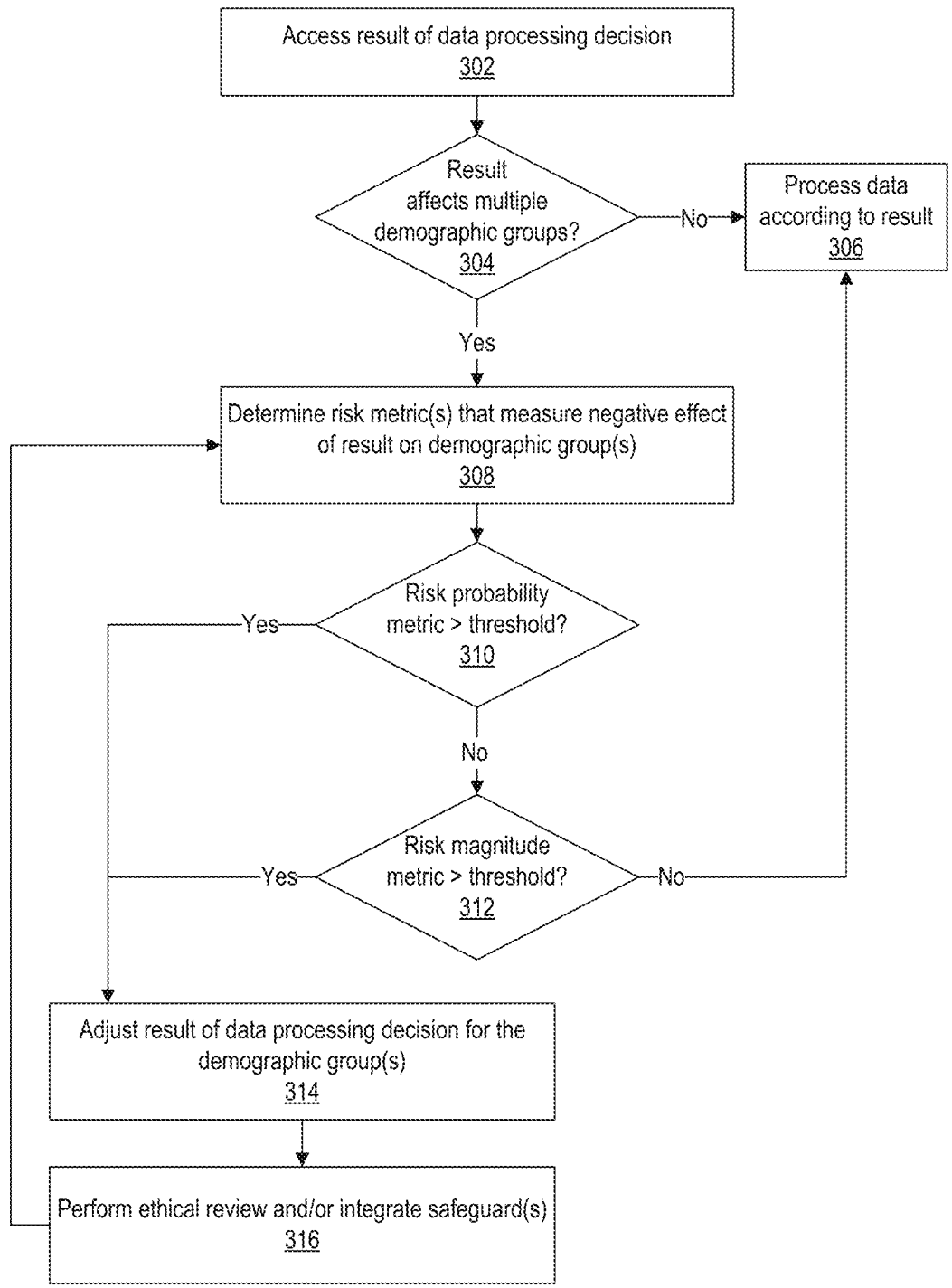
FIG. 3 depicts a flow diagram of an example process for demographic based adjustment of decision results for data processing, according to implementations of the present disclosure.

FIG. 3 depicts a flow diagram of an example process for demographic based adjustment of decision results 108 for data processing, according to implementations of the present disclosure. Operations of the process may be performed by one or more of the decision engine 104, the data ethics module 110, the data processing module(s) 120, or other software module(s) executing on the decision processing computing device(s) 102 or elsewhere.

The result 108 of a data process decision may be received or otherwise accessed (302). As described above, the result 108 may be the result of an ethical decision processed by the decision engine 104. A determination may be made (304) whether the result 108 affects multiple demographic groups 204. In some examples, this determination may be whether the result 108 affects individuals in different geographic locations of any size or specificity. In some implementations, the determination may be whether the result 108 negatively affects multiple demographic groups 204 by being contrary to one or more data ethics rules 112 associated with one or more of the multiple demographic groups 204. If the result 108 does not affect multiple demographic groups 204, e.g., if the result 108 affects a single demographic group 204, the data may be processed (306) according to the original result 108. If the result 108 affects multiple demographics groups 204, one or more risk metrics 116 may be determined. In some implementations, the decision of 304 may be omitted or may be a pass-through, such that the risk metric(s) 116 are determined even if only a single demographic group 204 is (e.g., negatively) affected by the result 108.

In some implementations, multiple risk metrics 116 are determined. For example, a risk probability metric 116 may be determined that indicates a probability that the result 108 is contrary to at least one data ethics rule 112. As another example, a risk magnitude metric 116 may be determined that indicates a magnitude or severity of the violation of at least one data ethics rule 112, quantified through application of an algorithm. In some instances, the magnitude and/or severity may be with respect to particular benchmarks, criteria, and/or externals standards. If an outcome could impact the life of another, such as the quality of life, physical health, mortality, and/or other aspects, there may be space for an ethics review. For example, a credit score decision could pose significant harm to an individual in need of credit, and therefore questions may be asked about the factors used to arrive at that score, whereas a recommendation of a book or an ice cream flavor may not pose a risk of significant harm. In some instances, the most extreme potential harm may be used to assess the potential for harm in any particular analysis task.

In some implementations, a risk metric 116 may be determined that is a combination (e.g., a multiplicative product) of the risk probability and the risk magnitude. The risk metric(s) 116 may measure whether there is a significant (e.g., high) probability of potential harm to a demographic group 204 if the result 108 is not adjusted, where significant is determined with respect to some benchmark or threshold for (e.g., tolerable) harm. The risk metric(s) 116 may also measure whether there is a probability of significant (e.g., serious, severe, or irreversible) harm to a demographic group 204 if the result 108 is not adjusted. In some examples, the harm to a demographic group 204 may be physical harm, emotional distress, financial harm, a violation or loss of privacy, and/or other types of harm. In some examples, the violation of a data ethics rule 112 may itself be considered as harm incurred by individuals in a demographic group 204 that is associated with the violated data ethics rule 112.

Categories of harm may include but are not limited to: Algorithmic profiling, Algorithmic cruelty, Replication of existing bias (e.g. red lining), Uncritical assumptions, Improper research controls, De-anonymization, Personally Identifiable Information, False neutrality, Invasion of privacy, Data insecurity, Lack of transparency, Failure due to complexity, High-risk consequences, Inability to seek recourse, Accurate but not right, Disparate impact, Unproven models and/or methods, Deception, Harassment, Shaming, Re-victimizing, Consent issues, Filtering, Inaccurate or missing disclosure, and/or Lack of sufficiently diverse sample.

A determination may be made whether one or more risk metrics 116 exceed one or more predetermined risk thresholds. In some implementations, if none of the risk metric(s) 116 exceed a threshold, the data may be processed (306) according to the original result 108. In some implementations, if at least one of the risk metric(s) 116 exceeds a threshold, the result 108 may be adjusted (314) for the affected demographic group(s) 204. In some implementations, an ethical review process may be performed (316) to ensure that undue and/or asymmetric harm is not brought to one group as opposed to another. In some implementations, one or more safeguards may be integrated into the adjusted result to minimize possible harm to one or more groups. The process may then return and begin another iteration may determining risk metric(s), as shown in FIG. 3.

In some implementations, a risk metric 116 may be a binary value, e.g., either a result 108 violates at least one data ethics rule 112 or it does not violate a data ethics rule 112. In such implementations, the determination whether the risk metric 116 exceeds a threshold may be a determination of whether a data ethics rule 112 is violated. In the example of FIG. 3, a risk probability metric 116 is compared (310) to a threshold and a risk magnitude metric 116 is compared (312) to a threshold. If either metric exceeds a threshold, the result 108 may be adjusted (314). If neither metric exceeds a threshold, the original result 108 may be employed to process (306) the data.

In some implementations, adjusting the result 108 may include changing the result 108 to comply with one or more data ethics rules 112 to generate an adjusted result 116 which is then used to perform data processing operations. In some implementations, adjusting the result 108 may include instructing the decision engine 104 to repeat its decision making process based on a different set of logic and/or based on different decision information 106. In some implementations, adjusting the result 108 may include training, refining, or otherwise modifying the decision engine 104 to output the adjusted result 118 for one or more demographic groups 204.

In some examples, the result 108 may differently affect different demographic groups 204 such as sets of individuals in different geographic locations. In some examples, the result 108 may differently affect different demographic groups 204 in locations that are at least partly included in other locations. For example, a result 108 may affect a general population of the United States differently on average than it affects a more specific population living in San Francisco, and it may differently affect an even more specific population that is part of a particular religious congregation in San Francisco. Implementations may employ the different data ethics rules 112 that apply to the different populations, and adjust results 108 to conform to the different data ethics rules 112 for different populations. In some implementations, data ethics rules 112 associated with a more specific (e.g., smaller) demographic group 204 may take precedence over other data ethics rules 112 that are associated with a broader demographic group 204. Following the example above, the data ethics module 110 may apply the data ethics rules 112 associated with the religious congregation instead of those that apply to the city or country as a whole, to ensure that data processing operations are performed in accordance with the data ethics rules 112 of the more specific group, at least for processing the data associated with that specific group. In some examples, the data ethics rules 112 for a more specific group may not be applied to the data associated with others outside the group if the others would be negatively affected through application of the more specific data ethics rules 112.

The implementations described herein may be applied in a variety of scenarios and to a variety of data processing operations. For example, a decision engine 104 may be configured to make decisions regarding data processing for the operation of a self-driving vehicle (e.g., automobile). In a particular instance, the decision engine 104 may decide between two possible options for moving the vehicle (e.g., swerving or not swerving). A first option may safeguard the driver of the vehicle while endangering other(s), and the second option may endanger the driver but avoid endangering the other(s). Different data ethics rules 112 may apply in different countries, different cultures, or different traffic systems with regard to whether the driver or the other(s) are to be preferentially safeguarded. The result 108 may be adjusted or not adjusted to conform to the different sets of data ethics rules 112 depending on the current location of the vehicle. When determining which data ethics rules 112 to apply, the relevant location may be the location of the decision processing computing device(s) 102 executing the decision engine 104 and/or the location of the individuals to be affected by the decision.

As another example, a decision engine 104 may make a decision regarding whether to collect personal data regarding users of an e-commerce portal or other online application, and use the data for various purposes. The decision engine 104 may reach a (e.g., default) result 108 to collect and use the data as needed. However, this decision may affect users who live in a location where data privacy rules dictate an opt-in policy such that users must provide their explicit permission for data collection and use. For users in that location, the data ethics module 110 may output an adjusted result 118 to enforce an opt-in policy on the subsequent data handling by the data processing module(s) 120. In some implementations, if a particular decision does not fall within the data ethics rules 112 or if there is a conflict between rules that is not resolvable by the data ethics module 110, the result 108 may be flagged for manual review and possible adjustment prior to being sent to the data processing module(s) 120.

As another example, a decision engine 104 may make a decision on providing an individual person's credit score and the data ethics module 110 may investigate the original data used to train the algorithm 106 and discover a violation of the data ethics rules 112. If the risk score is higher than the threshold, the result may be adjusted to determine an adjusted result 118. In such instances, the process may be flagged and brought to the attention of a data manager who is alerted of the violation and is given the option to select and/or create another algorithm or provide new training data. The adjusted result 118 is then provided to the decision engine 104 as shown in FIG. 1, and the adjusted result 118 goes through the same process again, starting with the decision engine 104. The process may iterate until the risk metric is at or below threshold, in which case the result 108 may be provided to the data processing module(s) 120 for further processing. In some implementations, the data processing module(s) 120 may process the result 108 differently based on whether the result 108 has been adjusted one or more times through one or more iterations of the process.

In some implementations, as data moves through different stages of a data supply chain, e.g., is collected, stored, modified, analyzed, communicated, deleted, etc., it may be accompanied by metadata that describes the various operations performed on the data. The metadata may also indicate the results 108 and/or adjusted results 118 of the various data processing decisions made with respect to the data. The data and its corresponding metadata may be stored, communicated, and otherwise handled in a container. In some implementations, the data and/or metadata may be stored on one or more blockchains. In some implementations, data processing decisions may be made with respect to data that is standardized and/or labeled such that it is sensitive to ethical decisions through the data supply chain. The data may be initially collected from form(s) (e.g., a web form), interview(s), sensor(s), or other software and/or hardware components. The collection of the data, or other data processing operations, may be triggered manually or as an automated process.

Figure 4:
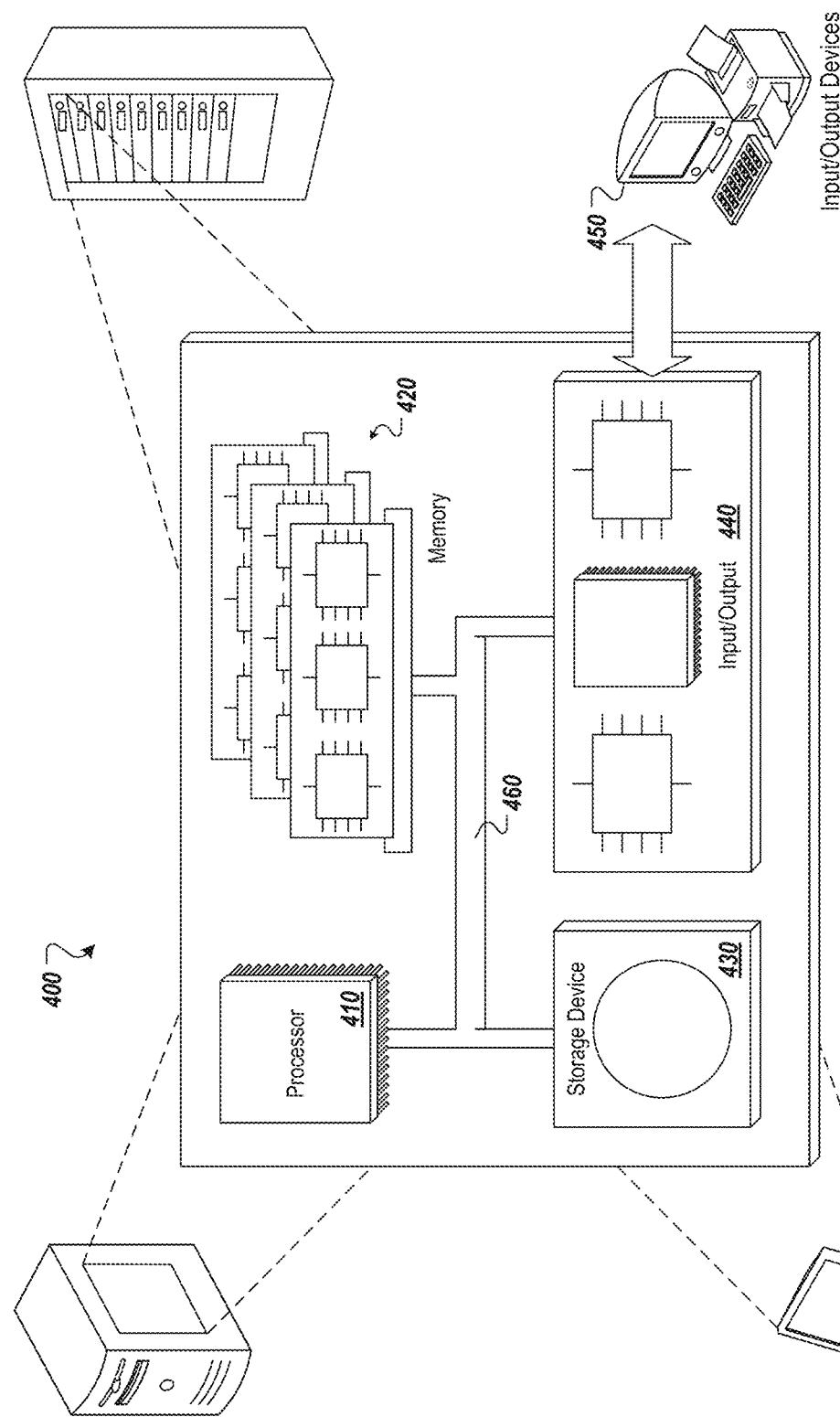
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in the decision processing computing device(s) 102 described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, a result of a data processing decision that is determined by an automated data processing decision engine that is trained, through at least one machine learning (ML) algorithm, to provide the result;

determining, by the at least one processor, that the result of the data processing decision is associated with multiple demographic groups;

accessing, by the at least one processor, data ethics rules that specify a plurality of data handling constraints associated with one or more of the demographic groups;

determining, by the at least one processor, at least one risk metric that measures a negative effect of the result of the data processing decision, the negative effect including non-compliance of the result with at least one data handling constraint that is specified in the data ethics rules and that is: i) applicable to data associated with at least one demographic group of the multiple demographic groups, and ii) not applicable to data associated with at least one different demographic group of the multiple demographic groups;

responsive to determining that the at least one risk metric exceeds at least one risk threshold, iteratively instructing, by the at least one processor, the automated data processing decision engine to adjust the result of the data processing decision to comply with the at least one data handling constraint that is applicable to the data associated with the at least one demographic group and recalculating the at least one risk metric based on the iteratively adjusted result, until the recalculated at least one risk metric does not exceed the at least one risk threshold, wherein instructing the automated data processing decision engine to adjust the result further includes using the non-compliant result to retrain the automated data processing decision engine using the at least one ML algorithm; and performing, by the at least one processor, at least one operation on the data based on the result of the data processing decision.

2. The method of claim 1, wherein the at least one operation includes one or more of collecting, analyzing, storing, communicating, or destroying the data.

3. The method of claim 1, wherein the multiple demographic groups correspond to different geographic locations of end-users associated with the data.

4. The method of claim 1, wherein the multiple demographic groups correspond to different age ranges of end-users associated with the data.

5. The method of claim 1, wherein:
the at least one data handling constraint includes at least one of a law, a rule, a regulation, and a norm applicable to the at least one demographic group; and
adjusting the result includes adjusting the result to comply with the at least one of the law, the rule, the regulation, and the norm.

6. The method of claim 1, wherein the at least one risk metric is based on one or more of:
a magnitude of the negative effect of the result on the at least one demographic group; or
a probability of occurrence of the negative effect of the result on the at least one demographic group.

7. The method of claim 6, wherein determining that the at least one risk metric exceeds the at least one risk threshold comprises one or more of:
determining that the magnitude exceeds a magnitude threshold; or
determining that the probability exceeds a probability threshold.

8. A system, comprising:
at least one processor; and
a memory communicatively coupled to the at least one processor, the memory storing instructions which, when executed by the at least one processor, cause the at least one processor to perform operations comprising:
receiving a result of a data processing decision that is determined by an automated data processing decision engine that is trained, through at least one machine learning (ML) algorithm, to provide the result;
determining that the result of the data processing decision is associated with multiple demographic groups;
accessing data ethics rules that specify a plurality of data handling constraints associated with one or more of the demographic groups;
determining at least one risk metric that measures a negative effect of the result of the data processing decision, the negative effect including non-compliance of the result with at least one data handling constraint that is specified in the data ethics rules and that is: i) applicable to data associated with at least one demographic group of the multiple demographic groups, and ii) not applicable to data associated with at least one different demographic group of the multiple demographic groups;
responsive to determining that the at least one risk metric exceeds at least one risk threshold, iteratively instructing the automated data processing decision engine to adjust the result of the data processing decision to comply with the at least one data handling constraint that is applicable to the data associated with the at least one demographic group and recalculating the at least one risk metric based on the iteratively adjusted result, until the recalculated at least one risk metric does not exceed the at least one risk threshold, wherein instructing the automated data processing decision engine to adjust the result further includes using the non-compliant result to retrain the automated data processing decision engine using the at least one ML algorithm; and
performing at least one operation on the data based on the result of the data processing decision.

9. The system of claim 8, wherein the at least one operation includes one or more of collecting, analyzing, storing, communicating, or destroying the data.

10. The system of claim 8, wherein the multiple demographic groups correspond to different geographic locations of end-users associated with the data.

11. The system of claim 8, wherein the multiple demographic groups correspond to different age ranges of end-users associated with the data.

12. The system of claim 8, wherein:
the at least one data handling constraint includes at least one of a law, a rule, a regulation, and a norm applicable to the at least one demographic group; and
adjusting the result includes adjusting the result to comply with the at least one of the law, the rule, the regulation, and the norm.

13. The system of claim 8, wherein the at least one risk metric is based on one or more of:
a magnitude of the negative effect of the result on the at least one demographic group; or
a probability of occurrence of the negative effect of the result on the at least one demographic group.

14. The system of claim 13, wherein determining that the at least one risk metric exceeds the at least one risk threshold comprises one or more of:

determining that the magnitude exceeds a magnitude threshold; or determining that the probability exceeds a probability threshold.

15. One or more computer-readable media storing instructions which, when executed by at least one processor, cause the at least one processor to perform operations comprising:

receiving a result of a data processing decision that is determined by an automated data processing decision engine that is trained, through at least one machine learning (ML) algorithm, to provide the result;

determining that the result of the data processing decision is associated with multiple demographic groups;

accessing data ethics rules that specify a plurality of data handling constraints associated with one or more of the demographic groups;

determining at least one risk metric that measures a negative effect of the result of the data processing decision, the negative effect including non-compliance of the result with at least one data handling constraint that is specified in the data ethics rules and that is: i) applicable to data associated with at least one demographic group of the multiple demographic groups, and ii) not applicable to data associated with at least one different demographic group of the multiple demographic groups;

responsive to determining that the at least one risk metric exceeds at least one risk threshold, iteratively instructing the automated data processing decision engine to adjust the result of the data processing decision to comply with the at least one data handling constraint that is applicable to the data associated with the at least one demographic group and recalculating the at least one risk metric based on the iteratively adjusted result, until the recalculated at least one risk metric does not exceed the at least one risk threshold, wherein instructing the automated data processing decision engine to adjust the result further includes using the non-compliant result to retrain the automated data processing decision engine using the at least one ML algorithm; and performing at least one operation on the data based on the result of the data processing decision.

16. The one or more computer-readable media of claim 15, wherein the at least one operation includes one or more of collecting, analyzing, storing, communicating, or destroying the data.

17. The one or more computer-readable media of claim 15, wherein the multiple demographic groups correspond to different geographic locations of end-users associated with the data.

18. The one or more computer-readable media of claim 15, wherein the multiple demographic groups correspond to different age ranges of end-users associated with the data.

19. The one or more computer-readable media of claim 15, wherein:

the at least one data handling constraint includes at least one of a law, a rule, a regulation, and a norm applicable to the at least one demographic group; and adjusting the result includes adjusting the result to comply with the at least one of the law, the rule, the regulation, and the norm.

20. The one or more computer-readable media of claim 15, wherein the at least one risk metric is based on one or more of:

a magnitude of the negative effect of the result on the at least one demographic group; or a probability of occurrence of the negative effect of the result on the at least one demographic group.

\* \* \* \* \*